Figure 4:
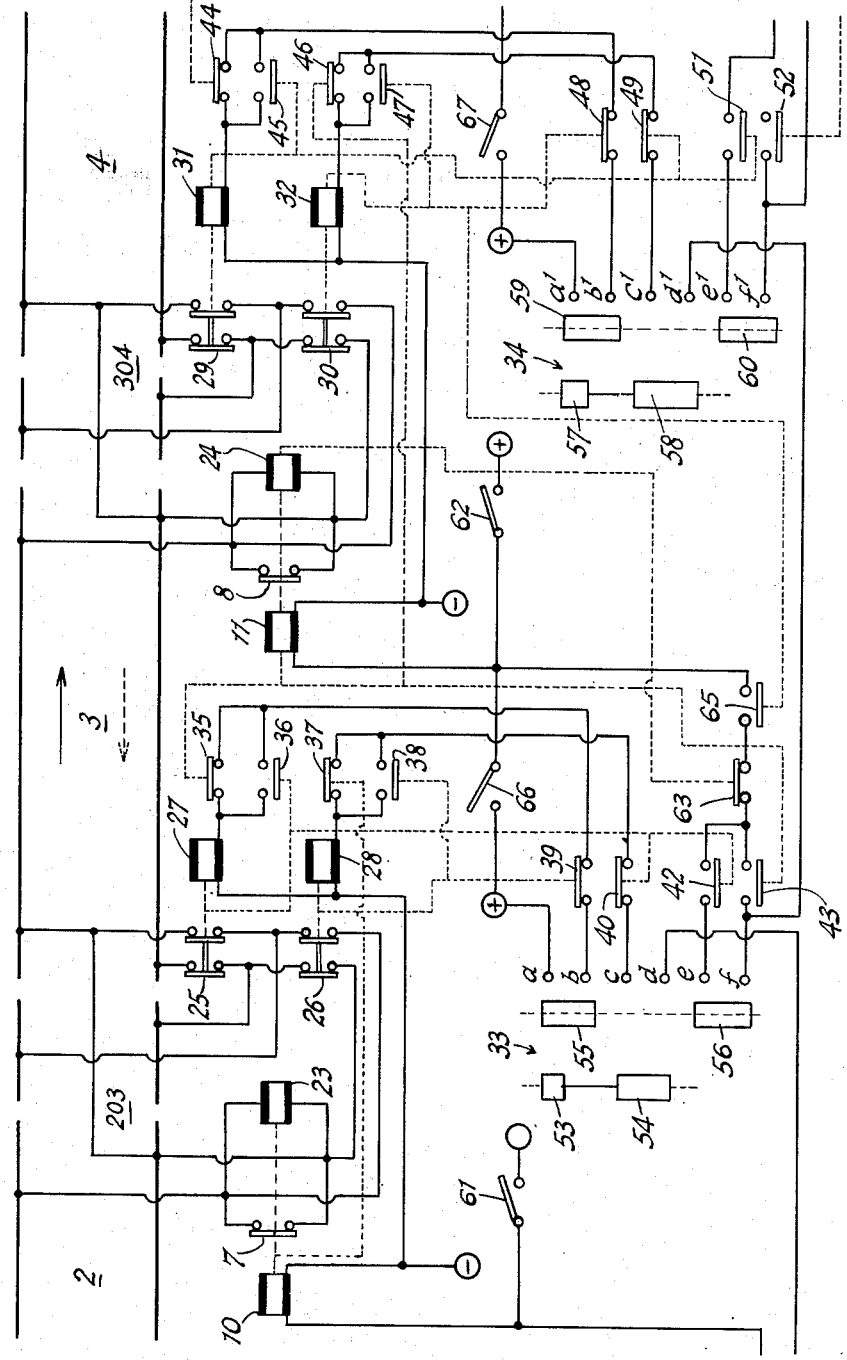

March 1, 1955     J. M. PESTARINI     2,703,345
SYSTEM OF SUPPLY OF ELECTRIC POWER AT CONSTANT INTENSITY
Filed Feb. 25, 1948     2 Sheets-Sheet 1
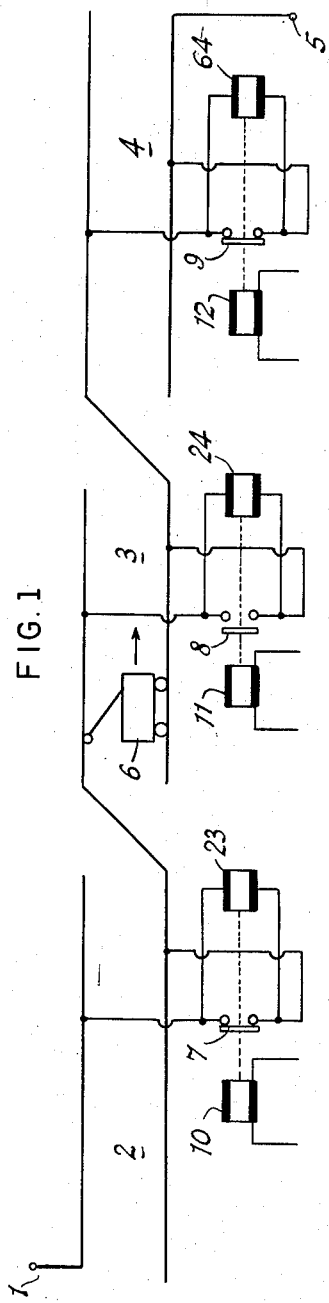
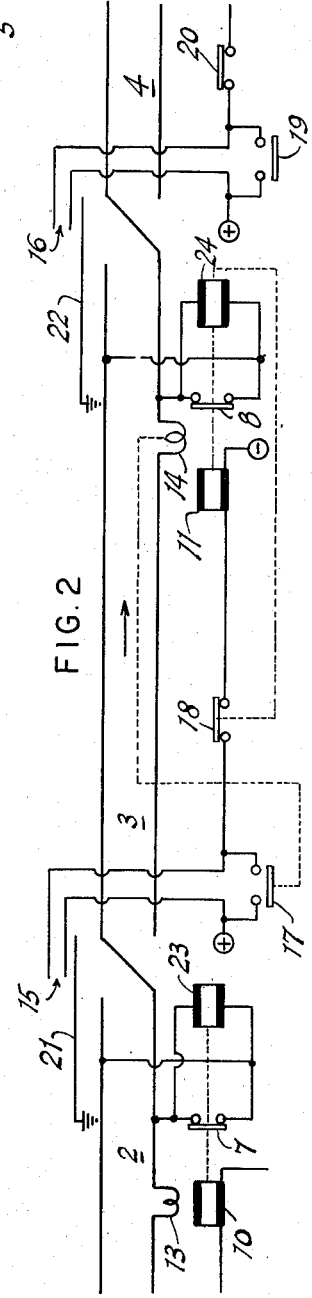
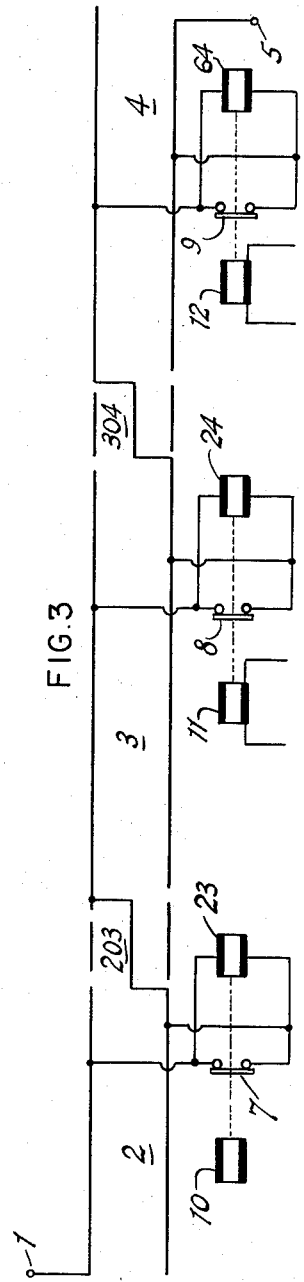
INVENTOR
Joseph M. Pestarini
BY
ATTORNEY March 1, 1955  J. M. PESTARINI  2,703,345
SYSTEM OF SUPPLY OF ELECTRIC POWER AT CONSTANT INTENSITY
Filed Feb. 25, 1948  2 Sheets-Sheet 2

INVENTOR
Joseph M. Pestarini
BY
Philip G. Hilbert
ATTORNEY

United States Patent Office 2,703,345
Patented Mar. 1, 1955

2,703,345

SYSTEM OF SUPPLY OF ELECTRIC POWER AT CONSTANT INTENSITY

Joseph Maximus Pestarini, Staten Island, N. Y.

Application February 25, 1948, Serial No. 10,725
In Italy March 17, 1941

Section 1, Public Law 690, August 8, 1946
Patent expires March 17, 1961

6 Claims. (Cl. 191—14)

This invention relates to a power transmission system. More specifically, the invention concerns the supply of electric energy to the motors of moving vehicles or trains.

Generally a moving vehicle receives energy from an electric source at constant voltage and the motors of the vehicles or trains are connected in parallel with one another when supplied by such source. In this case a very complicated switch gear is necessary for starting and manoeuvring the vehicles because it is then necessary to modify the voltage imposed on the motors from zero value to a given maximum value.

By the system considered in this invention, such a switch gear becomes unnecessary as the motors of a vehicle are supplied with constant current whatever may be the voltage they require and whatever may be the speed with which they run; in fact the source supplying the electric energy at constant current automatically supplies at any moment the right electromotive force necessary for keeping the intensity of the current constant whatever may be the voltage required by the motors.

Such a system of series distribution is rather simple when there is only one vehicle on the line and the difficulty arises when there are more vehicles moving on the line because they must be connected in series with one another, the said vehicles being supposed to run practically independent from one another.

This result is obtained, according to the invention, by subdividing the line into many line segments, the maximum length of each line segment never exceeding the minimum distance to be observed between two running vehicles in the same direction, the line segments being connected in series and each line segment being provided with a switch kept open when the vehicle occupies the said line segment and closed otherwise. In case of an accidental interruption of the line, the voltage at the time of interruption will increase far above the maximum value of the voltage induced by the motors of a single vehicle. According to the invention, a voltage relay, shunt connected across the two conductors of a line segment will operate to close the corresponding switch every time the voltage between the two conductors exceeds the above mentioned voltage limit. Thus any accidental interruption of the line in one line segment will not affect the normal operation in the other line segments. The said voltage relay will act even when the vehicle for some accidental reason runs at a dangerous speed and therefore its motors induce an electromotive force higher than the maximum normal limit and this is a safety feature of the system.

The above mentioned main features of the invention are completed with means of an easy and correct control of the switch of each line segment.

Three variants of this auxiliary wiring system for carrying out the correct control of the switch are hereunder described.

In the first variant, according to the invention, a current relay is inserted in one of the two insulated conductors of each line segment and it is located at the outlet of the line segment a little before the point where the connections of the switch are made. When a vehicle occupies the line segment, the current relay is traversed by the constant current supplied to the motors and while it is traversed by that current, it keeps the corresponding switch open; when the vehicle leaves the line segment, the said relay is out of circuit and therefore it is traversed by no current and it will then allow the switch to close. Thus the vehicle may automatically pass from one line segment to the next and automatically open the switch of the line segment occupied by the vehicle and close the switch of the line segment not occupied by a vehicle.

In the second variant, according to the invention, the switch is activated by means of a sliding contact placed along the line and activated by the vehicle while the same vehicle occupies the corresponding line segment.

The third variant corresponds to the case where the stops are so frequent that there is a station between every two consecutive line segments. According to the invention, manually operated means at the two stations at the end of each line segment insure the timely closing and opening of this corresponding switch by means of a magnet remotely controlled.

The invention will be better understood with the aid of the attached drawings and the following description of said drawings.

Figure 1 represents the main features of a power transmission line comprising only three segments for the simplicity of the drawings; Figure 2 gives the details of a line segment and shows two variants of the auxiliary network for controlling the switch; Figure 3 shows a modification of the main features in case a station is located between every two consecutive line segments; Figure 4 gives the details of a segment of Figure 3 with the complete wiring diagram of the auxiliary network for the control of the switch.

Figure 1 shows three line segments 2, 3 and 4, connected in series with one another. The supply source not shown, is connected at the terminal 1 and the terminal 5 and is supposed to supply a current of constant intensity, I. A vehicle 6 is represented occupying the line segment 3 while no vehicle occupies the line segments 2 and 4. The length of a line segment must not exceed the minimum distance allowed between two consecutive vehicles and therefore a line will generally have a large number of line segments and not only the three segments represented in Figure 1 for the sake of simplicity. Each segment is provided with a switch; the switch 7 bridging the segment 2, the switch 8 bridging the segment 3 and the switch 9 bridging the segment 4. The switch 8 is supposed to be open because the line segment 3 is occupied with the vehicle 6 while the other two switches 7 and 9 are supposed to be closed because their corresponding line segments are not occupied by a vehicle. The said switches may be operated by any means but preferably they are operated through the relays 10, 11 and 12 remotely controlled as by a source of current and a manually operable switch in circuit therewith. The energization and deenergization of relays 10, 11 and 12 is hereinafter described in detail. See Fig. 4.

When the vehicle 6 leaves the line segment 3 and occupies the line segment 4, the switch 9 must be opened and the switch 8 closed.

If for some accidental reason there is an interruption of the circuits in the motors of the vehicle 6, the voltage between the two conductors of the line segment 3 will increase above the maximum voltage limit at which the motors of a vehicle may operate at the maximum safe speed. Then there is provided the voltage relay 24 connected across the conductors of the segment which will operate the switch 8 and close it, reestablishing thus the continuity of the whole line. A similar voltage relay is indicated at 23 and 64 for the other two line segments.

In all figures, the same elements are indicated by the same numerals and therefore the meaning of the numerals will not be repeated for each figure.

Figure 2 gives a detailed scheme of the line segment 3. The arrow shows the direction of the vehicle.

Near the forward end of the line segment 3, a relay 14 is inserted in one of the line segments and is adapted to control relay 11 through an interlock switch 17 in circuit therewith.

All the time that the vehicle is in the line segment 3 rearwardly with respect to the current relay 14, the said relay will be traversed by the line current I and then the switch 8 will be kept open. When the vehicle is ready to leave the line segment 3, the relay 14 will be located rearwardly with respect to the vehicle and therefore it will not be traversed by any current and then it will allow the switch 8 to close.

The operation of the switch 8 may be obtained directly by a relay traversed by the line current I but it is preferable that the line current I acts only upon the relay 14. In its turn, this relay controls relay 11 directly operating the switch 8, the relay 11 being energized by an auxiliary constant voltage source. With current relay 14 energized, as when a vehicle enters segment 3, switch 17 is closed and allows relay 11 to be energized and to open switch 8. When the vehicle moves beyond relay 14, said relay is deenergized, opening switch 17 and deenergizing relay 11. With relay 11 deenergized, switch 8 closes to bridge the segment 3 as the vehicle leaves said segment to enter segment 4.

The interlock switch 17 is operated by the armature of the relay 14 and is closed when the relay 14 is energized.

One may easily see on the figure that the interlock switch 17 when lifted by the relay 14, reestablishes the line and that it interrupts the same when the relay 14 is no longer energized and its armature drops.

An interlock switch 18 which is operated by relay 24, interrupts the line when the relay 24 is energized and reestablishes the line when the relay 24 is not energized or is not sufficiently energized.

On the same figure are represented the over-voltage relay 23 and the current relay 13 corresponding to the line segment 2 and further the interlock switches 19 and 20 corresponding to the line segment 4 and having a similar action as the interlock switches 17 and 18 of the line segment 3.

It is obvious that the switch 8 will remain closed much longer than opened. It is, therefore, opened when its operating relay is energized and closed otherwise.

Now the action of the interlock switches 17 and 18 is as follows; when the current I traverses the relay 14 and there is no over-voltage between the two conductors of the line segment 3, the relay 11 is energized and the switch 8 is opened; on the contrary when the current relay 14 is not sufficiently energized or when there is an over-voltage between the two conductors of the line segment 3, the relay 11 is not energized and the switch 8 is closed.

When the vehicle leaves the line segment 3, the switch 8 is closed and therefore, for a short time, the motors of the vehicles will be short circuited. In order to avoid any trouble with the motors, a fixed, grounded contact 22 may be provided along the line near the forward end of the line segment 3, and engageable by a sliding contact on the vehicle, for a short circuiting of the field circuit of the motors of the vehicle during the short time that the vehicle is still on the line segment 3 and the switch 8 is closed.

When the vehicle enters the line segment 3, the line current I is subdivided between the two circuits in parallel, the circuit of the motors of the vehicle and the circuit closed by the switch 8. Generally, therefore, the current relay 14 will be traversed by a current as soon as the vehicle enters the line segment 3 and therefore it will open the switch 8. Nevertheless, for safety, a pair of parallel sliding contacts 15 connected in the circuit of relay 11, are provided along the line at the rear end of the line segment 3, such contacts being adapted to be bridged by a contact on the vehicle allowing for a temporary energizing of the relay 11.

On Figure 2, the contacts 21 and 16 have the same operation as the contacts 22 and 15 correspondingly.

It is obvious that if the sliding contact 15 would be prolonged along the whole line segment 3, the current relay 14 could be eliminated.

In case the stations are so frequent as to be located between two consecutive line segments, as it happens in an urban service, the third variant may be used, illustrated by Figures 3 and 4.

Between the two line segments 2 and 3 a station indicated by the numeral 203 is located and between the line segments 3 and 4 a station, indicated by the numeral 304, is located.

Each station is provided with two insulated conductors which may be connected to the corresponding conductors of the line segment located at one side or the other side of the station. For instance, the two insulated conductors of the station 203 may be connected to the corresponding conductors of the line segment 2 by closing the twin circuit breakers 26 and leaving open the twin circuit breakers 25; on the contrary, the said line conductors may be connected to the corresponding conductors of the line segment 3 by closing the twin circuit breakers 25 and opening the twin circuit breakers 26. A similar operation may be obtained at the station 304 by means of the twin circuit breakers 29 and 30. The twin circuit breakers 25, 26, 29 and 30 are operated by the relays 27, 28, 31 and 32 respectively.

Manually operable means is provided for controlling the operation of relays which actuate the circuit breakers 25, 26, 29, 30. To this end there is provided rotary controllers 33, 34 at stations 203, 304, respectively.

The controller 33 comprises a rotary member on which is mounted a pair of spaced interconnected contacts 53, 54 and a pair of spaced contacts 55, 56 insulated from each other. The controller 33 may be rotated to a position where contacts 53, 54 bridge certain fixed contacts; to a position where contacts 55, 56 bridge certain fixed contacts; and to a neutral position. Similarly, controller 34 has pairs of contacts 57, 58; 59, 60, which correspond to contacts 53, 54; 55, 56, respectively on controller 33.

The relays 10, 27, 28 are energized from an auxiliary current source with one end of each of the relay windings brought together at the negative terminal of the current source. The other end of the winding of relay 10 is connected to a positive terminal of the current source, with a manually operable switch 61 interposed. The other end of the winding of relay 27 is connected to fixed contact b of controller 33, with a pair of parallel connected interlock switches 35, 36 and interlock switch 39 interposed therebetween. Switch 35 is operated by relay 11, switch 36 by relay 27 and switch 39 by relay 28. The other end of the winding of relay 28 is connected to fixed contact c of controller 33, with a pair of parallel connected interlock switches 37, 38 and interlock switch 40 interposed therebetween. Switch 37 is operated by relay 10; switch 38 by relay 28 and switch 40 by relay 27.

Fixed contact a of controller 33 is connected to a positive terminal of the auxiliary current source, which is also connected to one side of the winding of relay 11, with a manually operable switch 66 interposed therein. The same side of the relay winding is connected to contact f of controller 33 with series connected interlock switches 43, 63, 65 interposed therebetween. An interlock switch 42 connects contact e of the controller with the juncture of switches 43, 63. Switch 42 is operated by relay 27; switch 43 by relay 11; switch 63 by relay 24 and switch 65 by relay 32. Fixed contact d on controller 33 and one side of the winding of relay 10 are adapted to be connected to a controller set up, not shown, for a preceding segment, not shown.

The relays 11, 31, 32 are similarly interconnected through interlock switches 44, 45, 46, 47, 48, 49, 51, 52, which are respectively operable by relays 12, 31, 11, 32, 32, 31, 31, 12, together with manually operable switches 61, 62 and the fixed contacts a', b', c', d', e' and f' of controller 34 interconnected with the relays and switches, in a manner entirely analogous to that previously described. Fixed contact d' is connected between contact f of controller 33 and switch 43.

Suppose the vehicle is in station 203 and the operators at the stations 203 and 304 desire to allow the vehicle to run on the line segment 3, then the operator at station 203 operates controller 33 to bridge fixed contacts a, b; e, f while the operator at station 304 operates controller 34 to interconnect fixed contacts a', c', d'. In this case current will energize relay 27, provided that the interlock switch 39 is closed and relay 28 is not energized and provided that the interlock switch 35 is closed and the relay 11 is not energized which leaves the switch 8 closed. Thus the two insulated conductors of the station 203 are connected to the corresponding conductors of the line segment 3. Simultaneously the auxiliary current energizes the relay 11 provided the interlock switch 42 is closed which means the twin circuit breakers 25 are closed and provided the interlock switch 63 is closed which means the over-voltage relay 24 is not energized or it is insufficiently energized and provided that the interlock switch 65 is closed which means that the relay 32 is energized. Then the switch 8 opens, the current traverses the motors of the vehicle and this may start and run along the line segment 3.

When the relay 11 is energized, the interlock switch 35 is opened but the relay 27 has been already energized and therefore the interlock switch 36 is closed and reestablishes the circuit. This means that the twin circuit breakers 25 remain closed although the switch 8 has been opened.

When the vehicle has left station 203, the controller 33 is rotated to a position, disconnecting thus the two insulated conductors at station 203 from the line segment 3 without closing the switch 8. In fact, as the switch 8 opens, since the relay 11 is energized, the interlock 43 is closed and therefore the current passes to the relay 11 by way of the contact members 57, 58 on controller 34.

The operator at station 304 is waiting for the vehicle and therefore he keeps the controller 34 at the position interconnecting fixed contacts $a'$, $c'$, $d'$ through rotatable contacts 57, 58 on controller 34. Then the auxiliary current energizes the relay 32 provided that the interlock switch 49 is closed, which means that the relay 31 is not energized and provided that the interlock switch 46 is closed which means that the relay 11 is not energized. To make sure that the switch 8 is not opened before the twin circuit breakers 30 are closed, the interlock switch 65 is provided, which closes only when the relay 32 is energized.

Thus the vehicle can start from station 203 and arrive at station 304.

From the above detailed description of the scheme, it is clear that the sequence of operation is as follows: the operators at stations 203 and 304 must agree on the course of operation; then the insulated conductors of the said stations are connected to the corresponding conductors of the line segment 3 and thereafter the switch 8 is opened. It is also obvious that the operator at station 203 may disconnect the insulated conductors from the line segment 3 immediately after the vehicle leaves station 203 without disturbing the normal running of the vehicle.

Once the vehicle has left station 203, running in the direction of the arrow in full lines, the operator at station 203 is relieved from responsibility. On the contrary the operator at station 304 must survey the movement of the vehicle until it reaches his station and he keeps the handle of controller 34 in the position interconnecting contacts $a'$, $c'$, $d'$.

If because of some emergency, operator at station 304 cannot receive the vehicle in his station or if he intends to stop the vehicle, he simply needs to bring the handle of controller 34 to the neutral position. Then the switch 8 closes and no energy is supplied to the vehicle and it stops.

If later the emergency is over and the operator at station 304 is ready to receive the vehicle in his station, he simply has to bring the handle of his controller 34 to the position interconnecting contacts $a'$, $c'$, $d'$ and manually close the emergency switch 62 for temporarily energizing the relay 11. The button 62 is kept open by means of a spring indicated on the drawings. As soon as the relay 11 is energized, it keeps itself energized by means of the interlock switch 43 and the vehicle is supplied with electric current and can start again to reach station 304.

The vehicle has been assumed to be running in the direction indicated by the arrow in solid lines but as shown in Figures 3 and 4 the vehicle may move as well in the other direction, indicated on Figure 4 by the dotted line arrow, under the same conditions of safety. The operators at the two stations must coordinate their actions, bring the handle of the controller 33 to the position bridging contacts $a$, $b$; $e$, $f$ and the handle of the controller 34 to the position interconnecting contacts $a'$, $c'$, $d'$, and keep the handle of the controllers at their positions until the vehicle arrives at station 203; they may, in a case of emergency, stop the vehicle by bringing the handle of controller 33 to the position leaving the fixed contacts thereof open and finally restarting the vehicle by again bringing the handle of the controller 33 to the original position and by temporarily operating the switch 66.

The switch 67 has the same function as the switch 66 in respect to segments 2, 4 respectively.

One may allow for more than one vehicle to run independently between two stations by combining the variant indicated by Figure 2 with the variant indicated by Figure 4. The line segments shown in Figure 4 are obviously located near the stations while any number of line segments of Figure 2 may be located between the two above mentioned line segments of Figure 4.

The assembly of the complete scheme of the line comprised between two consecutive stations, according to the above combination, is obviously a repetition of the drawings of Figures 2 and 4.

Having given full detailed descriptions of the system and having illustrated three different variants, it is obvious that modifications may be brought and other variants may be contrived without pretending to make a new invention.

I claim:

1. A power transmission system for electrically operated vehicles comprising a loop circuit adapted to be supplied with direct current of constant intensity and of a voltage automatically variable in accordance with the voltage requirements of the motors of said vehicles, said loop circuit comprising a plurality of successive segments insulated from one another, each segment comprising a pair of conductors, the conductors of each segment being connected to the conductors of adjacent segments to provide a single series circuit, switch means for short circuiting the conductors of each segment, relay means for operating each switch means, a source of current for energizing said relay means, manually operable switch means in circuit with said source of current and said relay means, said relay means being operative to short circuit the conductors of each segment unoccupied by one of said vehicles and being further operative to open each of said switch means associated with a segment occupied by one of said vehicles, and second relay means connected across each switch means and responsive to voltages in excess of a predetermined voltage to close said switch means.

2. A system as in claim 1 and further including a third relay in circuit with one of the conductors of each segment, a normally open switch in circuit with said first mentioned relay, said third mentioned relay being energized upon entry of a vehicle into the segment associated therewith and operative to close said last mentioned switch.

3. A system as in claim 2, wherein said third relay is located at one end of each segment.

4. A system as in claim 2 and further including a normally closed second switch in circuit with said first mentioned relay and operable by said second mentioned relay to open the circuit to said first mentioned relay in response to voltages in said segment in excess of a predetermined voltage.

5. A system as in claim 3 and further including a pair of spaced contacts in series circuit with said first mentioned relay, said contacts being located at the other end of each segment and adapted to be bridged by a contact on a vehicle entering said segment.

6. A system as in claim 1 and further including a pair of conductors located between and in insulated relation to successive segments, switch means for connecting said pair of conductors to one adjacent segment, second switch means for connecting said pair of conductors to the other adjacent segment, relay means for operating each of said switch means, a control circuit including both of said last mentioned relay means and means in said control circuit for selectively operating said relay means.

References Cited in the file of this patent

UNITED STATES PATENTS

| | | |
|---|---|---|
| 439,070 | Hunter | Oct. 21, 1890 |
| 708,656 | Murray et al. | Sept. 9, 1902 |
| 745,382 | Potter | Dec. 1, 1903 |
| 883,964 | Latey | Apr. 7, 1908 |
| 1,091,694 | Neble | Mar. 31, 1914 |
| 1,708,886 | Jackson | Apr. 9, 1929 |
| 1,917,083 | Anderson | July 4, 1933 |
| 1,973,538 | Moffett | Sept. 11, 1934 |
| 2,009,973 | Nelson | July 30, 1935 |
| 2,249,853 | Randall | July 22, 1941 |

FOREIGN PATENTS

| | | |
|---|---|---|
| 160,480 | Germany | May 6, 1905 |
| 303,872 | Great Britain | Nov. 28, 1929 |
| 391,345 | Italy | Jan. 13, 1942 |